United States Patent [19]

Lees

[11] Patent Number: 4,484,691
[45] Date of Patent: Nov. 27, 1984

[54] PRESSURE RELEASE DEVICE

[75] Inventor: Wayne L. Lees, Lexington, Mass.

[73] Assignee: Duracell Inc., Bethel, Conn.

[21] Appl. No.: 43,515

[22] Filed: May 21, 1979

Related U.S. Application Data

[63] Continuation of Ser. No. 628,445, Nov. 3, 1975, abandoned.

[51] Int. Cl.³ .............................................. F16K 17/40
[52] U.S. Cl. ................... 220/89 A; 137/68 R;
361/433; 429/56; 429/82
[58] Field of Search .................. 220/89 A, 207, 268;
361/433; 222/541, 397; 429/89, 82, 55, 56;
148/146; 137/68 R

[56] References Cited

U.S. PATENT DOCUMENTS

| | | | |
|---|---|---|---|
| 2,066,866 | 11/1936 | Hetenyi | 361/433 |
| 2,199,519 | 5/1940 | Collins et al. | 220/207 |
| 2,331,870 | 10/1943 | Coxe | 148/146 X |
| 2,726,181 | 12/1955 | Lyon | 148/146 |
| 3,003,668 | 10/1961 | Sherlock et al. | 222/541 |
| 3,076,584 | 2/1963 | Sherlock | 222/541 |
| 3,204,156 | 8/1965 | Moresi et al. | 429/82 X |
| 3,244,316 | 4/1966 | Atkinson et al. | 220/89 A |
| 3,292,826 | 12/1966 | Abplanalp | 220/268 X |
| 3,307,746 | 3/1967 | Edwards | 222/529 X |
| 3,503,806 | 3/1970 | Sugalski | 429/55 |
| 3,622,051 | 11/1971 | Benson | 222/397 |
| 3,724,727 | 4/1973 | Zundel | 222/397 |
| 3,826,412 | 7/1974 | Kneusel | 222/397 |
| 3,831,822 | 8/1974 | Zundel | 222/397 |
| 3,850,339 | 11/1974 | Kinkel | 220/89 A |
| 3,918,610 | 11/1975 | Willis | 220/207 X |
| 3,921,556 | 11/1975 | Wood et al. | 220/89 A X |

OTHER PUBLICATIONS

Alloy Steel Reference Book, 3rd ed., Joseph T. Ryerson and Sons, Inc., N.Y. and Sundry, 1951.

Primary Examiner—Allan N. Shoap
Attorney, Agent, or Firm—Ronald S. Cornell; Israel Nissenbaum

[57] ABSTRACT

Pressure release means for pressurized containers and particularly electrochemical cell containers subject to pressure eruption conditions in which the pressure release means is an integral part of the container wall. This means is actuated at predetermined abnormal pressure at which a relatively rigid and undeformed wall area between two deformed portions of the container wall tears to form a vent. This vent can be adapted to provide either slow or rapid pressure release.

1 Claim, 8 Drawing Figures

PRESSURE RELEASE DEVICE

This is a continuation of application Ser. No. 628,445, filed Nov. 3, 1975, now abandoned.

This invention relates to pressure release devices for containers and especially to electrochemical cells which are subject to undesirable increases of internal pressure.

Prior art pressure release devices include safety valves, rupture membranes, shearing plugs, sharp points which are forced through sheets and the like. A problem with all these devices is that their inherent properties make it difficult to combine the characteristics of low cost, precision in venting at a specific pressure, adequate sealing for the pressurized container and a degree of strength against accidental triggering by mechanical abuse or malfunction. For example, a safety valve, which is made to open when the force on the valve exceeds that of a spring, is adequately precise with respect to venting at a specific pressure. However, this is offset by the costly requirement for added parts, which are susceptible to mechanical accidents, and precise fit for hermeticity which can lead to increased cost. Additionally, such devices rely upon the stability of a seal for hermetic closure and corrosive substances within a container could render this seal ineffective.

Rupturable membranes consist of a weakened portion of a vessel or container wall which provides hermetic closure until the contained pressure is sufficient to tear the membrane. Though it is less complicated in terms of material than the safety valve, its curvature, thickness and material condition require close control because the pressure at which the membrane tears is determined not by the stable elastic properties of the membrane but by its ultimate plastic-deformation behavior which is dependent upon composition and the mechanical and thermal history of the material. Thus while the seal is adequate the cost of precision in the release pressure becomes high. Any cost saving realized by requiring less precision in venting pressure is offset by the need for additional strength and weight of the vessel or container to accommodate higher pressures. Additionally, for small openings the membrane must be so thin that protection from puncture and corrosion would also become necessary, thus further increasing the cost. Simple grooves in the wall of containers such as have been used in capacitors have the additional deficiencies of lengthy tear propagations and the absence of vent closure after the excess pressure has been released unless an expensive spring container is used. These deficiencies can be especially detrimental if caustic materials are contained in the container.

Other methods for venting such as shearing the periphery of a plug, or the forcing of a sharp tool through a sheet, remain imprecise to the extent that the venting pressure depends on the varying physical characteristics of the material used in actuating the venting process. Additionally, shearing plugs depend on adding materials of low shear strength to the wall and these materials must be selected to be compatible with the container contents.

It is therefore an object of the present invention to provide a pressure release device which integrates the features of low cost, good precision in venting and an hermetic seal for pressurized vessels or containers.

It is another object to provide a pressure release device which is an integral part of the container wall and which requires no additional foreign material.

Another object is to provide a pressure release device which can be formed to vent at a predetermined slow or rapid rate.

It is still another object to provide a pressure release device which will substantially close after venting to inhibit further egress of container materials or the ingress of foreign matter.

Another object is to provide a low cost pressure release device which can be formed by die pressing.

Another object is to provide a pressure release device which is based upon the predictable behavior of a bending strain rather than a tensile strain.

It is another object to provide a method for pressure venting which is low cost, precise within acceptable limits, and requires no materials other than the walls of a container to be vented.

It is yet another object to incorporate all of the above features in a pressurized container or vessel.

Another object is to incorporate all of the above features in an electrochemical cell which because of its contents is either in a pressurized state or subject to a high degree of pressure buildup.

These and other objects, features and advantages will become more evident from the detailed description below as well as from the drawings, in which.

The present invention envisions a pressure release device integrated into a container or vessel wall in which a stress caused by pressure is concentrated and directed at a preselected portion of the container wall causing this preselected portion to tear under an undesirable increase of pressure thereby forming a vent for release of the pressure. The concentration of stress is obtained because the normal contour of a container wall has been altered to provide two deformed and more extensible sections between which is a small undeformed or less deformed and relatively inextensible section of wall. This undeformed section is adapted to rupture when the pressure level within the container reaches a predetermined level. As the internal pressure increases either the end or side walls of the container are forced outwardly and the deformed sections of the container wall will tend to unfold while undergoing relatively slight bending strain. However, this unfolding can be achieved only with stretching of the undeformed section of wall that is between the two deformed portions thereof. This section, referred to herein as a "bridge", "bridging" or "bridging area", cannot extend in the same way as the deformed portions and therefore is subjected to high tensile stress which leads ineluctably to the tearing or rupturing of the bridging area thereby forming a vent. The deformations will advantageously be elongated and in the form of channels arranged so that an end of one is aligned with an end of another with a bridge therebetween. The container material can be of metal such as steel or nickel-plated steel or of plastics or rubber which can contain pressurized contents and have predictable movement under stress.

The container materials most suitable for the use of the structures can those that are capable of undergoing substantial inelastic elongation before breaking.

Figure 1:
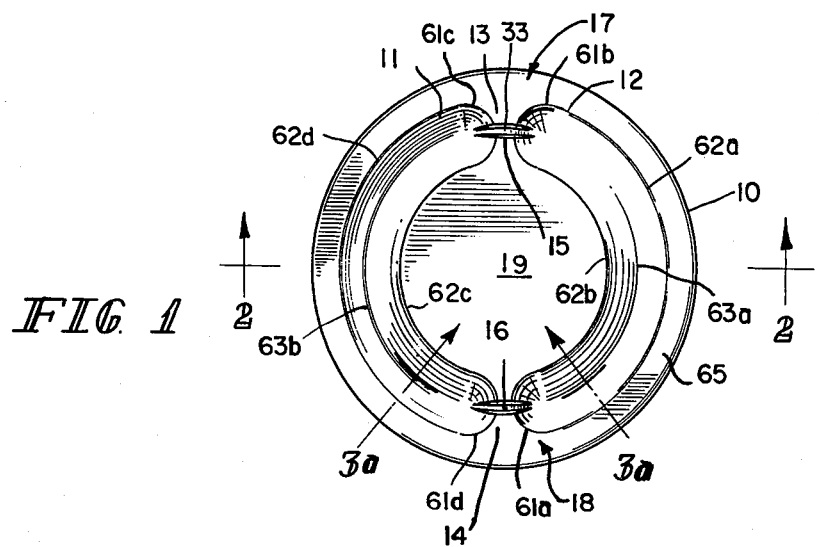
FIG. 1 is a plan view of the end wall of a container embodying the pressure release device of the invention.

Referring now to the drawings, FIG. 1 shows the end of a container 10 which has been die pressed and/or deep drawn to include annular channels 11,12 as the deformed areas. The ends 61 a–d, edges 62 a–d and bases 63 a–b of the channels are preferably of rounded configuration; thus the channels can be formed by drawing and stretching processes without the development of weak spots that could be susceptible to corrosion or mechanical breakage. However other shapes could also be used. These channels 11,12 are capable of unfolding under pressure by undergoing bending strain. It matters little whether the channels extend inwardly into the container or outwardly from it, so long as extensibility under pressure is possible. The bridges 13,14 between the ends of channels 11,12 are the points at which venting takes place because the bridge is subjected to tensile strain beyond its rupture point while the channels still have substantial extensibility. Grooves 15,16 are either cut or pressed as arcuate grooves which extend across the bridges and down the ends of the adjacent channels since these are regions of transition from the high strain at the undeformed portions of the bridges to the low strain at the fully deformed portions of the channels. The grooves 15,16 of the bridge areas 13,14 are relatively small yet provide sufficient venting, as opposed to the simple grooves of the prior art which must be larger to be effective and therefore would have the disadvantages of being more susceptible to mechanical or corrosion damage and to formation of wide openings.

High tensile stress is concentrated in the grooved portions 15,16 of the bridge areas 13,14 and not in the adjoining areas such as the outer annulus 65 adjacent the bridge areas. The depth of the groove is substantially determinative of the degree of this concentration and a groove having a depth of at least about half of the original wall thickness is usually adequate.

The width at the base of each groove is made such that the rupture which occurs in the groove takes place during that part of the outward displacement of the disc 19 for which the excessive internal pressure varies least. In order to ensure moderately uniform strain across the groove base and so to avoid premature rupture it is preferable that the junctures of the groove base with the side walls of the groove are rounded, and the material thickness of the groove base between these junctures is approximately constant. The desired base width depends upon and is a function of the container material's characteristic elongation to rupture under tensile stress, and of the structure-determined pulling apart of the groove walls as excessive internal pressure increases. The material of the groove base is strained in direct proportion to the displacement that widens the groove, and in inverse proportion to its initial width. Thus, for example, the preferred groove base width for the more extensible annealed mild steel will be made smaller than that for the same steel which has been work-hardened. A material allowing several-fold extension before rupture, such as annealed pure copper or fine silver, lead, rubber, or some plastics, would require a much narrower groove, for the same structure, than that suited to mild steel.

If the grooves in a metal have been formed by cold pressing, the base material is hard and relatively inextensible, but a simple anneal restores its ductibility and stabilizes its mechanical and chemical properties. The grooves, with the adjoining areas including the bridges and the ends of the channels, can be annealed by application of heat sufficient to make the entire areas 15,16 red hot for about a second. It has been found that by annealing the metal in the area where rupture is desired it is possible to provide more exact control over the moment of venting by counteracting the effects of cold working the metal container. The annealing also provides the groove area, which is the weakest part of the container structure, and the surrounding area, which has been subjected to forming-stresses, with a degree of resistance against corrosion and attack from materials contained within the container of which the groove is a part, and also reduces the susceptibility to mechanical injury.

Figure 2:
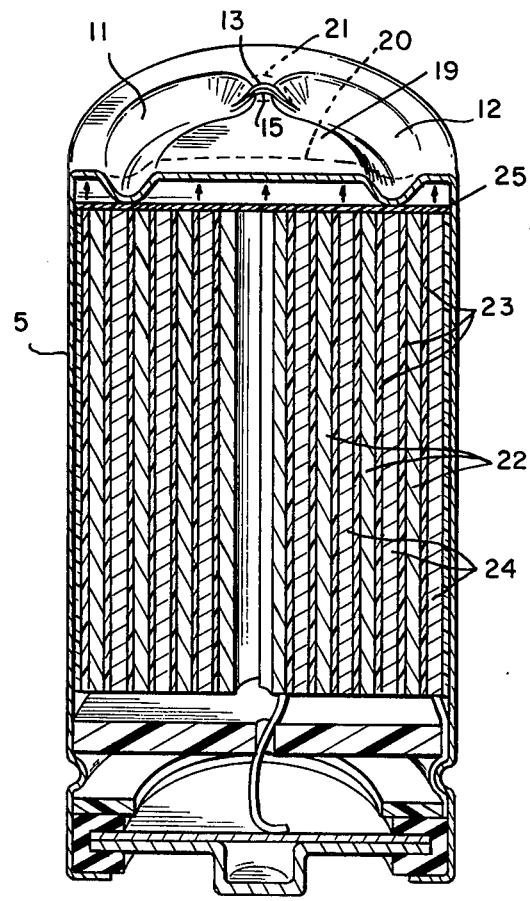
FIG. 2 is a perspective view of FIG. 1 with a portion, taken along line 2—2 of FIG. 1, shown in section. This figure shows a specific embodiment of the container of the invention wherein it is used for an electrochemical cell.

In the embodiments shown in FIGS. 1–4 the channels 11,12 have a central disc 19 therebetween. When the pressure in the container exceeds normal operating pressure the central disc 19 will be forced outward. This will, in turn, place both the channels 11,12 under bending stress and the bridge area 13,14 under tensile stress. FIG. 2 shows the movement of the channels 11, 12 under this stress, by dotted line 20. The pressure force existing in the container is shown by arrows. The dotted line 20 shows that the channels have been unfolded partially but not completely at the time of venting. When the venting pressure has been reached, the groove is stretched to the shape as in the embodiment where the container is formed of mild steel, shown by dotted line 21, roughly 35–50% wider than originally, and is ruptured or torn. It is desirable to have the groove tear while the deformed portions are still extensible because this allows further opening of the vent if the excess pressure is not relieved. However, these tears are limited to the bridge area because as the channels unfold, the ends of the convolutions do not undergo appreciable tensile stress. The tensile load released by the ruptured bridge does not propagate the tear into the channel regions since the area adjacent to the tear has retained its strength even when the channels have fully unfolded. Simple grooves do not have this characteristic since the areas adjacent to the ends of the groove have been subjected to full tensile stress causing weakening and when the groove ruptures the adjacent area does not have sufficient strength to contain the tear. Limiting of the tears to the chosen vent regions is generally aided by the greater thickness of the channel material. Thus, the groove 16 shown in FIG. 3a provides a limited vent in any metal that is sufficiently ductile to allow deep drawing, even when internal pressure after venting remains high enough to unfold the channels fully. The channel material will, of course, advantageously be of such thickness as to permit unfolding without bending fracture. For homogeneous rigid materials, including those for which reinforcement is impractical, means are needed to reduce tensile stress, across the ends of a vent crack, enough to prevent further rupture. Such means are shown in the embodiment of FIG. 3b where the end of the groove 35 dips below the lowest level of the rest of the channel. The thinned portions 38,39 under the groove are compressed as the channel unfolds, off-setting the tension that otherwise could extend the groove crack. Thus, there generally should be a differential in strain between the vent area and the desired end of the vent accomplished by these or other similar means.

With the elastic-recovery movement of the channels after venting, the vent that has opened will close sufficiently to inhibit container material from escaping and foreign material from entering the container. This is especially important with electrochemical cells containing substances which are incompatible with ambient atmospheric materials. This latter feature tends not to be present in vents that consist only of a thinned groove in the wall of a container.

The disc 19, by its movement shown by the dotted line 20, exerts a pulling force on both the channels and the bridge area. This force produces small, predominately bending strains in the channels with concomitant large outward displacement of the disc, and on the groove 15 in the bridge area 13 a large tensile strain which increases until the groove is eventually ruptured.

FIG. 2 shows container 5 having a pressure release device of this invention as it is used in a typical electrochemical cell that in some instances can develop excessive internal pressure. The cell shown is one in which the anode 22 is lithium and the cathode depolarizer is $SO_2$. Separator mats 23 separate the anode 22 from the cathode current collector 24. After the cell has been made hermetic the $SO_2$ is introduced into it. An insulating disc 25 separates the cell components from the outer cell wall and the pressure release mechanism; however this disc is not a hermetic separator and excess fluid and its concomitant pressure can circumvent this disc and operate on the pressure release device integrated into the cell wall.

Figure 4:
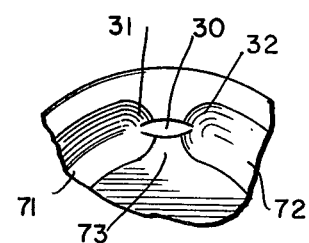
FIG. 4 shows the portion of the container where venting takes place. In this figure another embodiment of the invention is shown, namely one in which the shape of the venting area differs from that shown in FIG. 1.
Figure 3A:
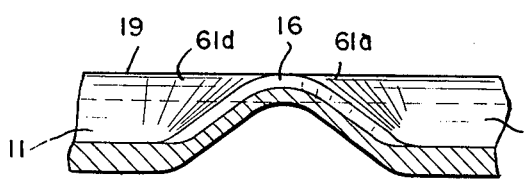
FIG. 3a is an enlarged sectional view taken along line 3a—3a of FIG. 1.
Figure 3B:
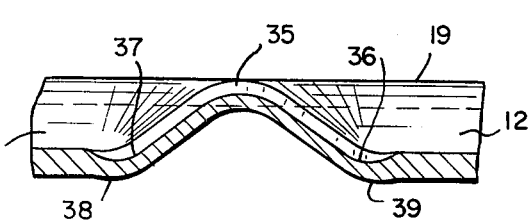
FIG. 3b is an enlarged sectional view similar to 3a of another embodiment of the invention in which there is provided an additional reinforcing section.

FIG. 4 relates to an embodiment similar to that of FIG. 1 and shows the ends 31, 32 of adjacent channels 71,72 and the bridging area 73 therebetween. Groove 30 is of lenticular shape with its width approaching zero as it approaches the end of the most deformed portion of the channels 71,72. Differing shapes of groove alter the venting process. A groove of uniform width such is that shown in FIG. 1 ruptures first at the center of the bridge area 33 forming a lenticular slit whose extremities progress down the channel ends, with continued outward motion of disc 19, until they reach the ends of the thinned (or extensible) material at the base of the groove. The groove embodiment as shown in FIG. 4 is strained roughly the same amount throughout its length and ruptures in a roughly full-length but initially very narrow slit extending along the full length of the thinned base of the groove. The resulting partial decrease of restraint on the disc 19 allows more abrupt vent opening than that of the uniform width groove at the time of rupture, with a more rapid decrease of pressure. Thus the venting action can be varied or controlled from a slow, pressure-regulating release to an abrupt opening of a substantial vent.

Figure 5:
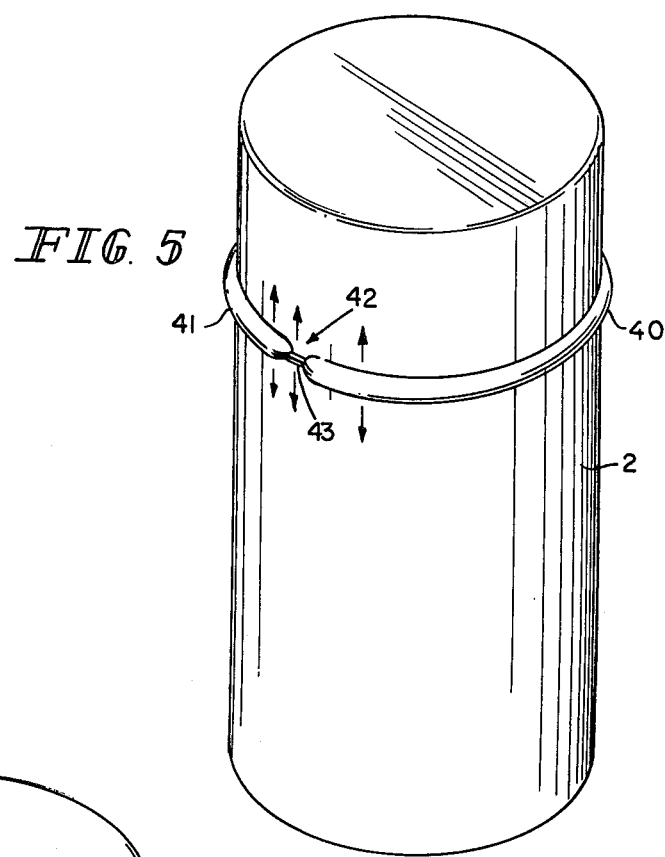
FIG. 5 is a perspective view of another embodiment of the invention wherein the pressure release device is incorporated into a side wall of the container.

FIG. 5 shows another embodiment of this invention in which a cylindrical container 2 is provided with a pressure release device in the form of circumferential deformations 40,41 in the side wall thereof. Though the deformations 40,41 are shown as facing outward, the direction has little bearing on the pressure release device's operation. In this embodiment the direction of the operative tension is axial as shown by the arrows, and the deformations can unfold to increase the axial length of the container. In this way the tensile stress is concentrated on the bridge area 42 and particularly in the groove 43 which tears under this strain while the deformations 40,41 still are capable of further unbending as previously explained.

Figure 6:
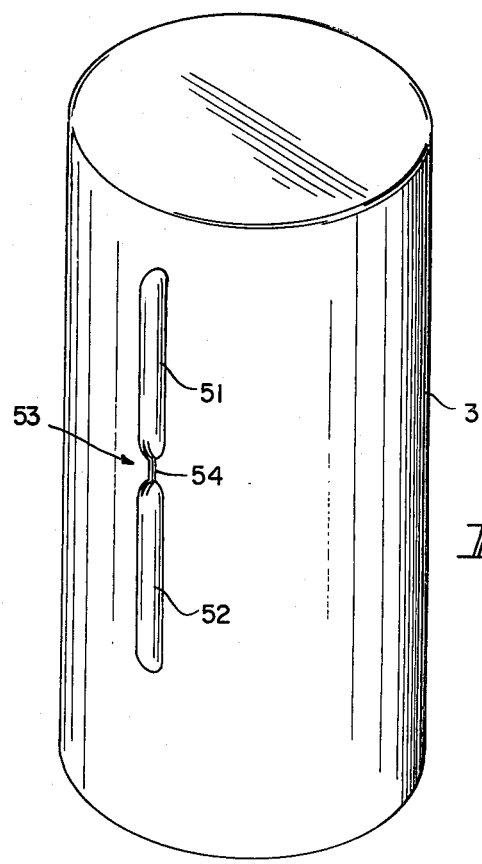
FIG. 6 is a perspective view of another embodiment of a container made in accordance with the invention.

FIG. 6 shows another variation in structure in which the channels 51,52 are formed in the cylindrical side wall of a container but are not circumferential in form. Instead the channels 51,52 are in a direction parallel to the axis of the cylinder. Excessive pressure within the container distends its circumference and the channels 51,52 unfold with only a bending strain, while the bridging area 53 is subjected to high tensile strain causing the wall to rupture at groove 54. It should be noted that the structures of FIGS. 1-4 have two characteristics not found in the embodiments of FIGS. 5 and 6. First, in the former the vent is formed in a bridge between two quite different members—a central disc 19 and an outer annular ring 65—rather than between two like members. The outer annulus, with the adjoining part of the container walls, is subjected to a contractile force along the diameter passing through the bridges, when the disc is forced outward by excessive internal pressure. The width of this annulus will desirably be sufficient to support the contractile force without undergoing plastic deformation so that the force can continue to increase and to strain the groove base material until it ruptures. Second, as the disc is displaced outwardly from the plane of the outer annulus under excessive internal pressure, the bridges are rotated slightly from their original plane but undergo little initial elongation, thereby providing a degree of protection against accidental release by pressure vent formation in the bridge area.

Figure 7:
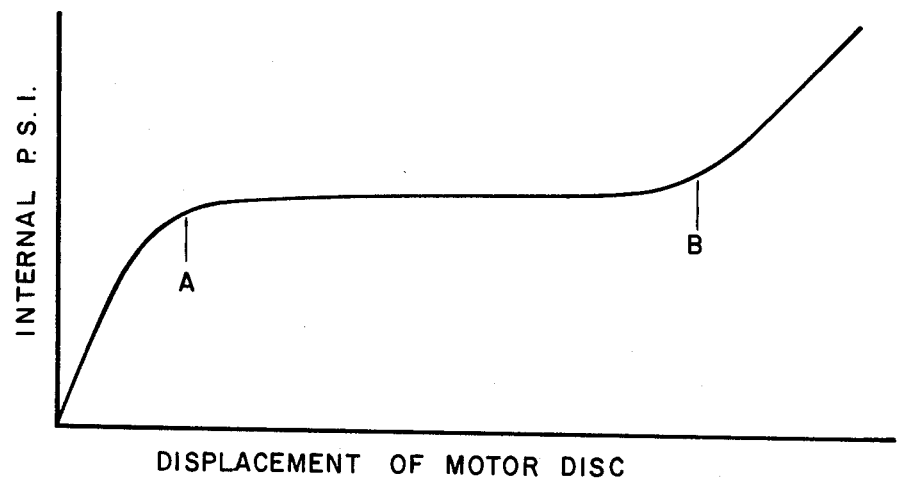
FIG. 7 is graph showing the general relationship between displacement of the disc in the embodiment shown in FIG. 1 and venting pressure.

FIG. 7 illustrates the motion of disc 19 in FIG. 1 as a function of internal pressure. The inclusion of the channels in the container end wall allows substantial outward motion of the disc with minor strain of channel material. As the disc moves outward, the internal pressure changes only gradually so that a pressure plateau is reached as shown between points A and B followed by more rapid pressure increase when the channels are unfolded to the point where further unfolding becomes difficult. Though substantial motion of disc 19 continues within the plateau, the pressure within the cell varies little. Thus the bridge area is severely strained during this movement is previously explained and ruptures during this predictable pressure plateau making it possible to predetermine with reasonable precision the internal pressure at which the vent will form. In order to ensure rupture of the groove within a predetermined desired pressure range such as the pressure plateau the width of the groove can be varied, with a greater width causing rupture towards the upper end of the curve and a lesser width causing rupture towards the lower end of the same curve. Because of the relative sizes of the grooves and the channels the greatest part of the force exerted by excessive internal pressure is directed to unfolding the deformations or channels with only a minor part of the force exerted to place the grooves under tensile strain. Once the groove has been extended beyond its proportional limit, both the minor force that widens this section to rupture and the major force unfolding the deformation are little changed. Thus, while the internal container pressure remains substantially constant during the unfolding of the deformations, the bridge section is severely strained to rupture. It is therefore the reproducible movement of the deformations which determines the pressure at which the vent is formed. The position of the plateau as it relates to venting pressure is dependent, to a large extent, upon the thickness of the wall of the container at the channels. Thus the container can be made to vent at a higher pressure if the thickness of the channel wall is increased and at a lower pressure if decreased. Similarly if the channels are annealed the pressure plateau is attained more quickly and at a lower internal pressure level. Venting will thus occur at a lower pressure. The following examples set forth the characteristics of a specific type of container.

Standard D-size cell containers as shown in FIG. 2 were formed by deep-drawing mild steel to 1.3 inch outside diameter 0.020 inch container thickness, channels of 0.9 inch ridge diameter and 0.08 inch depth with the channel sides forming an angle of 80° with each other. The grooves, traversing the bridges between adjoining channel ridges, were pressed about 0.01 inch deep and had a maximum width of about 0.025 inch at the center of the bridges. After local annealing of the bridges and adjoining channel ends, the containers vented at 450≅25 psi. Release pressures beyond these limits were found when substitution of 0.021 inch stock stiffened the channels to increase the vent pressure to 485±25 psi. Such variables, of course, are controlled in manufacturing to maintain specified dimensions and material condition. These pressure ranges for venting are sufficiently precise and in the useful range of operating pressures for use for hermetically sealed, pressurized, electrochemical cells.

What is claimed is:

1. A container having a pressure release device in a wall thereof, said wall being deformed whereby to form channel means for permitting a portion of said wall to move outwardly, and a small relatively undeformed section of said wall being positioned between adjacent portions of said channel means, said relatively undeformed section including a groove therein with said groove extending across said section to connect adjacent portions of said channel means and wherein the inner width configuration of said groove is lenticular.

* * * * *